May 21, 1935.  E. P. VALBY ET AL  2,002,101
METHOD AND APPARATUS FOR CONTINUOUSLY DETERMINING VAPOR PRESSURE
Filed May 23, 1932
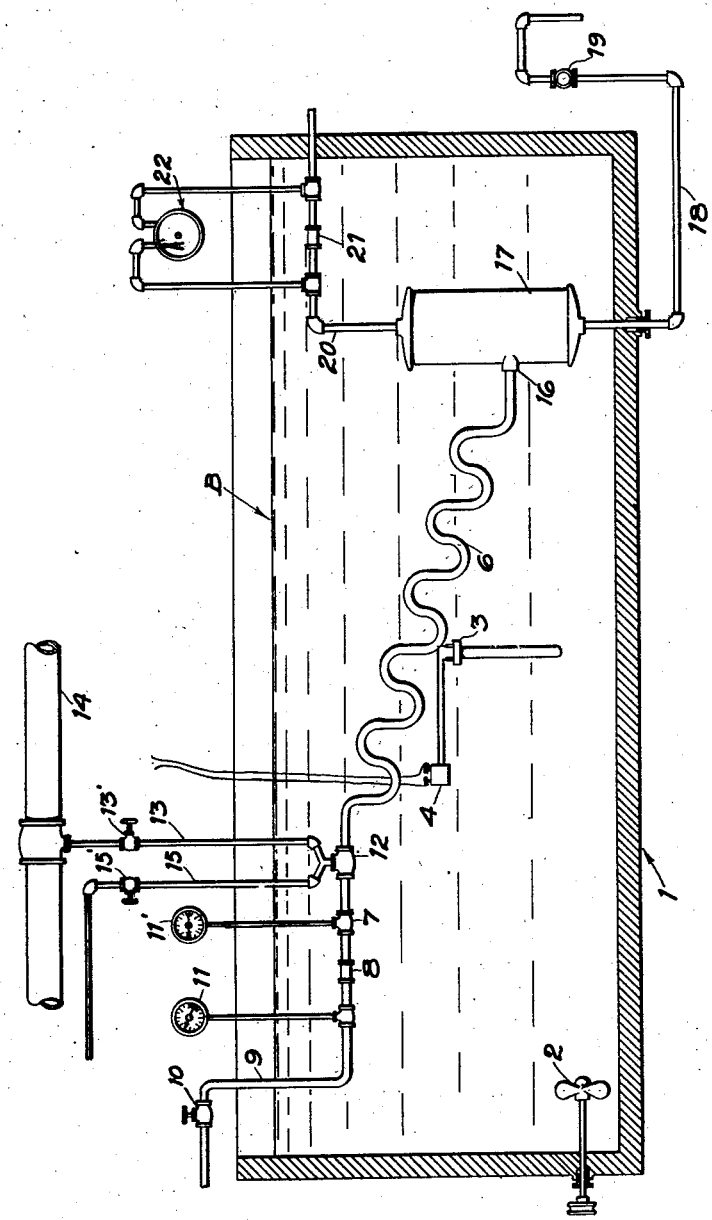
INVENTORS
EDGAR P. VALBY
MARION L. ARNOLD
BY
ATTORNEY Patented May 21, 1935

2,002,101

UNITED STATES PATENT OFFICE 2,002,101

METHOD AND APPARATUS FOR CONTINUOUSLY DETERMINING VAPOR PRESSURE

Edgar P. Valby and Marion L. Arnold, Long Beach, Calif.

Application May 23, 1932, Serial No. 612,980

6 Claims. (Cl. 73—51)

This invention has to do in a general way with the measurement of vapor pressure and is more particularly directed to a method and an apparatus whereby a continuous measurement of the vapor pressure of a flowing stream of liquid can be obtained.

It is a well known fact among those familiar with the art, that the vapor pressure of volatile liquids, such as gasoline, etc., has become one of the most important factors in the specifications under which such liquids are sold. This is especially true of casing head or natural gasoline and the distillation and condensing equipment used in recovering such gasoline in the absorption process, is now controlled so as to yield a product of specified vapor pressure.

It is important, therefore, since these processes are largely continuous in operation, to have some means for observing the vapor pressure of the product for controlling the temperatures in the refining equipment. This has been done heretofore by taking samples of the condensate from time to time and determining the vapor pressure of such samples by means of a so-called vapor pressure bomb. Such a procedure is obviously insufficient for controlling the operation of modern continuous refinery equipment, and it accordingly becomes a primary object of this invention to produce a method and an apparatus whereby the vapor pressure of the condensate or discharge liquid can be determined at any time from a reading obtained directly from a "flowing sample."

In this connection it is a further object of the invention to produce a method and apparatus whereby a continuous daily record of vapor pressure measurements may be obtained for checking the operation of the refinery and determining the vapor pressure of the product.

Inasmuch as certain distillation processes, especially those used in the refining of gasoline, are carried out with steam, there is in such processes a certain amount of water vapor in the product, and it is a further object of this invention to develop a method for measuring the vapor pressure of the pure liquids, and correcting for any contamination with water vapor.

The details in the process contemplated by this invention and a preferred type of apparatus employed in practicing the same, will be best understood from the following description of the accompanying drawing which is chosen for illustrative purposes only and which shows, diagrammatically, a preferred form of apparatus used in the practice of the invention.

The principle which forms the basis for the method contemplated by this invention is that of air equilibrium, using an orifice meter or other suitable means, such as a displacement meter, to measure the volume of air and vapor mixture. Essentially the method is to bring a constant stream of air into equilibrium with a continuous flow of the liquid whose vapor pressure is to be measured (gasoline) and measure the increase in volume of air, brought about by the introduction of vapors from the liquid. This measurement can be very easily obtained from the pressure differential across an orifice placed in the path of flow.

It, therefore, follows that our invention is based upon the principle that the partial pressure of a vapor in a gas-vapor mixture bears a direct relation to the relative volume of vapor in the mixture. In other words, assume a certain volume $Qm$ of gas-vapor mixture having $Qa$ parts of gas (air) and $Qv$ parts of vapor, to have an absolute pressure P at a given temperature. Then the partial pressure of the vapor, or the vapor pressure (VP) bears the same relation to the total pressure as the volume of vapor does to the total volume or $$VP = \frac{Qv}{Qm} \times P = \left(\frac{Qm-Qa}{Qm}\right) \cdot P \qquad (a)$$

It will be seen therefore that if the volume of an air and gasoline vapor mixture for example at a given pressure is known, and the volume of air alone at the same pressure is known, the vapor pressure can be readily calculated from Equation (a) above.

Referring to the drawing which shows, diagrammatically, one form of apparatus which can be used for obtaining values or measurements for use in connection with Equation (a) (or more particularly with another equation which will be derived from Equation (a)) we have at B, a constant temperature bath of any well known type which is shown as comprising a tank 1, provided with a stirring device 2, and equipped with a heater 3, controlled by a thermostat 4 for maintaining a constant temperature.

In this connection it is to be understood that the temperature must be maintained constant so that the vapor pressure measurements are all obtained for a predetermined temperature.

The vapor pressure apparatus itself is shown as comprising a gas-vapor equilibrium chamber or equilibrium tube 6 which is preferably inclined and provided with a plurality of bends so as to provide liquid seals to assure intimate contact between the gas and the liquid for assuring complete equilibrium. The equilibrium tube 6 is provided with an inlet connection 7 which in turn is provided with an orifice connection indicated at 8 through which a suitable gas (preferably air) is delivered into the equilibrium tube from the air supply pipe 9. The latter is connected through a pressure reducing valve 10 with a source of air under pressure (not shown). Reference numerals 11 and 11' indicate pressure gauges for observing the pressure in the air connections 7 and 9.

In the practice of the invention it is important that the volume of air passing through the equilibrium tube be constant at all times and this can be accomplished by using a pin hole orifice at 8 and maintaining a pressure drop of 20 lb. per sq. inch or more across this orifice, since for pressure drops of more than 50% the volume of air passed by an orifice is constant irrespective of changes in downstream pressure.

Reference numeral 12 indicates a liquid inlet connection which is shown as being provided with a conduit 13 leading to a source of liquid whose vapor pressure is to be determined, such as the pipe 14. Another connection 15 is provided for admitting another liquid such as water, which may be a contamination in the first liquid. The purpose of this connection will be hereinafter more fully explained. With regard to the inlet and outlet connections, it will be understood that the liquid whose vapor pressure is to be measured may be passed through the equilibrium chamber in a direction opposite to the direction of flow of the gas by a slight change in the arrangement of these connections.

The outlet 16 of the equilibrium tube is connected with a separating vessel 17 which has a liquid outlet 18 provided with a valve 19 for controlling the liquid level in the tank, and a gas outlet 20. The gas outlet 20 is provided with an orifice 21 and suitable means such as the recording pressure gauge 22 for measuring the pressure differential across the orifice.

In operating the apparatus, the valve 10 is first regulated so that a constant volume of air is passing through the equilibrium tube 6. The valve 19 being closed, this air flows through the orifice 21 and the pressure differential of the air ($Ha$) is measured. If the final vapor pressure is to be corrected for a contamination with water, the valve 15' is opened and the value of $Ha$ is the pressure differential for air saturated with water vapor. The valve 15' then remains open and the final vapor pressure values are automatically corrected for water contamination, since the air, in both the first and second differential pressure measurements, is saturated with water vapor. In other words, there can be no change in the second pressure reading over the first due to water vapor from the gasoline as the air is saturated with water vapor in both instances. After the reading ($Ha$) is obtained the valve 13' is adjusted so that a stream of liquid is admitted to the stream of air. The liquid as it passes through the equilibrium tube 6, is partially vaporized to saturate the air or air and water vapor and is brought to equilibrium before it enters the separating chamber 17. At this point the unevaporated liquid separates and is drawn off through connection 18 and the air and vapor mixture passes through outlet 20 and orifice 21, the pressure differential of the mixture ($Hm$) being recorded on the recording gauge 22.

From the foregoing description, it will be seen that we now have as known factors:—the pressure differential of the air, or air and water vapor ($Ha$) across the orifice 21; the pressure differential of the mixture ($Hm$) and the downstream pressure ($P_1$) from the orifice 21 which in this case is the barometric pressure.

Going back to Equation ($a$) we also know that:

$$Qa = Ca\sqrt{Ha}\sqrt{P_1} \qquad (b)$$
$$Qm = Cm\sqrt{Hm}\sqrt{P_1} \qquad (c)$$

where $Ca$ and $Cm$ are the orifice coefficients for the air, or air and water vapor, and the mixture, respectively.

Also the absolute pressure of the mixture $$P = P_1 + Hm. \qquad (d)$$

and the absolute pressure of the air, or air and water vapor, $$= P_1 + Ha$$

But $Qa$ in Equation ($a$) must be corrected to the actual volume it would have at the equilibrium pressure $P$, then $Qa$ (corrected)

$$= Ca\sqrt{Ha}\sqrt{P_1} \times \frac{P_1 + Ha}{P_1 + Hm} \qquad (e)$$

Then substituting Equations ($b$), ($c$) and ($d$) in Equation ($a$) we have $$VP = \frac{(Cm\sqrt{Hm}\sqrt{P_1}) - \left[(Ca\sqrt{Ha}\sqrt{P_1}) \times \frac{(P_1 + Ha)}{(P_1 + Hm)}\right]}{Cm\sqrt{Hm}\sqrt{P_1}} \times$$

$$(P_1 + Hm) = (P_1 + Hm) - (P_1 + Ha) \times \frac{Ca\sqrt{Ha}}{Cm\sqrt{Hm}} \qquad (f)$$

Now $$Cm = Ca \frac{1}{\sqrt{G}}$$

Where $G$ is the specific gravity of the vapor mixture with respect to air, or the gas for which $Ca$ is the orifice coefficient. Then substituting in ($f$)

$$VP = (P_1 + Hm) - (P_1 + Ha) \frac{\sqrt{G}\sqrt{Ha}}{\sqrt{Hm}} \qquad (g)$$

Since the factor $G$ is generally in the neighborhood of 1, it may for most purposes be disregarded so that it is not necessary to know the dimensions of the orifice plate or the style of pressure connection made.

From the foregoing description, it will be seen that so long as the volume of air passing through the apparatus is maintained constant, and the liquid stream is maintained so that the air is always saturated with liquid, the reading on the scale 22 will always be a measure of the vapor pressure of the liquid, and it is only necessary in the refinery operation to control the product so that this reading is maintained at the predetermined value to give the desired product of uniform quality. Also, knowing the value of $Ha$ at which the apparatus is operated, the vapor pressure may be calculated at any time from Equation ($g$).

With regard to the liquid such as water which is introduced at 15', it is to be understood that this is done to automatically correct for the presence of any water in the liquid whose vapor pressure is being measured. It is to be understood, however, that if there is no water in the liquid introduced at 13, the apparatus may be operated without the introduction of water at 15.

In the event the liquid is one in which air is readily soluble, it is advisable, for accurate results, to saturate the liquid with air before admitting it to the apparatus.

It is to be understood that while we have herein described and illustrated one preferred method and apparatus for practicing our invention, that the invention is not limited to the precise terms of such description but includes within its scope whatever departures fairly come within the spirit of the appended claims. It is to be further understood that the term "orifice" as used herein is to include all equivalent restricted passages such as short tubes, flow nozzles, Venturi throats and the like.

We claim as our invention:

1. A method for the continuous determination of the vapor pressure of a liquid which comprises: passing a substantially constant stream of gas at a predetermined temperature through an orifice; measuring the pressure differential of the gas as it passes through the orifice; introducing a stream of said liquid into said stream of gas; bringing the gas and the vapor of said liquid to equilibrium at said predetermined temperature; separating the liquid from the mixture of gas and vapor; passing the gas and vapor mixture through said orifice to measure the pressure differential thereof as an index of the change of density and volume; and determining the vapor pressure from a comparison of the initial and final pressure readings.

2. A method for determining vapor pressure which includes: passing a substantially constant stream of gas, at a predetermined temperature, through an orifice; measuring the pressure differential of the gas across said orifice; saturating the stream of gas with vapor; passing the mixture of gas and vapor through said orifice; to measure the pressure differential thereof as an index of the change of density; and determining the vapor pressure from a comparison of the initial and final pressure readings.

3. A method for determining the vapor pressure of a liquid which contains a second liquid whose partial pressure is always equal to its vapor pressure, which comprises: passing a substantially constant stream of gas saturated with the vapor of said second liquid at a predetermined temperature through an orifice; measuring the pressure differential of said gas and second liquid vapor across said orifice; saturating said gas and second vapor mixture with the vapor of the first liquid; passing the last mentioned gas and vapor mixture through said orifice to measure the pressure differential thereof as an index of the change of density and determining the vapor pressure from a comparison of the initial and final pressure readings; and calculating the vapor pressure of the first liquid from said pressure differential measurements.

4. An apparatus for obtaining vapor pressure measurements embodying: an equilibrium chamber; means for delivering a substantially constant stream of gas into said equilibrium chamber; means at the inlet of said equilibrium chamber for admitting a liquid whose vapor pressure is to be measured; a separating chamber at the outlet of said equilibrium chamber for separating the liquid from the gas and vapor mixture; a gase and vapor outlet from said separating chamber; an orifice in said gas and vapor outlet; and means for measuring a pressure differential across said orifice.

5. An apparatus for obtaining vapor pressure measurements embodying: an equilibrium chamber comprising a tube having a plurality of liquid seals therein; means for delivering a substantially constant stream of gas into said equilibrium chamber; means at the inlet of said equilibrium chamber for admitting a liquid whose vapor pressure is to be measured; a separating chamber at the outlet of said equilibrium chamber for separating the liquid from the gas and vapor mixture; a gas and vapor outlet from said separating chamber; an orifice in said gas and vapor outlet; and means for measuring a pressure differential across said orifice.

6. An apparatus of the class described embodying: an elongated equilibrium tube; means including an orifice for delivering a substantially constant stream of gas into said tube; means for delivering a liquid into the stream of gas passing through said tube at one end thereof; means comprising a separate chamber at the outlet end of said tube for separating the liquid from the gas and vapor mixture coming from said tube; a gas and vapor outlet connection to said separating means; a liquid outlet connection in the bottom of said separating means; an orifice in said gas and vapor outlet connection; and means for measuring the pressure differential across said orifice.

EDGAR P. VALBY.
MARION L. ARNOLD.